United States Patent [19]
Geng et al.

[11] 3,763,470
[45] Oct. 2, 1973

[54] CIRCUIT ARRANGEMENT FOR ERROR DETECTION IN DATA PROCESSING SYSTEMS

[75] Inventors: Hellmuth R. Geng, Schonaich; Johann Hajdu, Boeblingen; Petar Skuin, Magstadt; Edwin Vogt, Boeblingen, all of Germany

[73] Assignee: International Business Machines Corporation, Armonk, N.Y.

[22] Filed: Jan. 20, 1972

[21] Appl. No.: 219,358

[30] Foreign Application Priority Data

June 26, 1971 Germany .................. P 21 31 787.3

[52] U.S. Cl. ........................................ 340/146.1 AG
[51] Int. Cl. ............................................ G06f 11/10
[58] Field of Search ......... 340/146.1 AG, 146.1 AB, 340/146.1 C, 172.5

[56] References Cited

UNITED STATES PATENTS 3,473,150 10/1969 McClelland ............... 340/146.1 AG
3,525,077 8/1970 Jablonski ................. 340/146.1 AG

*Primary Examiner*—Charles E. Atkinson
*Attorney*—John C. Black et al.

[57] ABSTRACT

In a data processing system, a first processing unit is connected to several other processing units by one transfer bus each for the two directions of transmission, a circuit arrangement for error detection being associated with the transfer lines. The first unit comprises a check character generator generating a parity check character both for the information to be transferred from the first processing unit to the further processing units and from the further processing units to the first processing unit. The transfer lines of both directions are provided with a common transfer path, by means of which the parity check characters generated by the check character generator are transferred from the first unit to the further units. Each of the further units comprises a check circuit connected to the two transfer buses and the check character transfer path and checking the correctness of the transferred information for both directions of transmission.

9 Claims, 5 Drawing Figures

Patented Oct. 2, 1973 3,763,470

3 Sheets-Sheet 1

CIRCUIT ARRANGEMENT FOR ERROR DETECTION IN DATA PROCESSING SYSTEMS

BACKGROUND OF THE INVENTION

The invention relates to a circuit arrangement for error detection in data processing systems with at least two separate units connected to each other by means of transfer paths.

During the transmission of information between the units of a data processing system, each information path in known circuit arrangements is associated with a separate transfer path for check information which may be a check number or a parity bit (Technical Disclosure Bulletin, Volume 12, No. 11, April 1970, pages 1,932 and 1,933, published by and available from International Business Machines Corporation). When information is transmitted, via a first path, from a unit A to a unit B, a parity bit associated with the information concerned is generated in unit A and transferred to the check information transfer path. A check circuit in unit B receives both the transmitted information and the parity bit, determining the correctness of the transmission. An identical arrangement is provided for transmission in the reverse direction, that means from unit B to unit A. This arrangement has the disadvantage that relatively extensive circuitry is required for generating, transmitting and evaluating the check information.

It is also known to transfer data and control signals on one transfer path at different times and to associate both types of signal with the same parity line (German Pat. No. 1,230,075). In this arrangement, the kind of parity (even or odd) additionally serves to indicate whether the transmitted signals are data or control signals. Although in this circuit the number of transfer lines is reduced during transmission in one direction, the check information still has to be generated at the place of transmission, to be transferred on a separate line for each direction of transmission and to be evaluated in a check circuit at the place of reception.

SUMMARY OF THE INVENTION

It is the object of the invention to provide a circuit arrangement for error detection in which the circuitry required for handling the check information, and in particular the number of check character transfer lines, is reduced. To this end, the arrangement in accordance with the invention is characterized in that the first unit comprises a check character generator generating a check character for the information to be transferred from the first to the second unit and from the second to the first unit, that a common check character transfer path is provided for the two transfer paths, which transfers the check characters generated by the check character generator from the first to the second unit, and that the second unit comprises a check circuit which is connected to the two information transfer paths and the check character transfer path, checking the correctness of the transmitted information for both directions of transmission.

BRIEF DESCRIPTION OF THE DRAWINGS

The foregoing and other objects, features and advantages of the invention will be apparent from the following more particular description of preferred embodiments of the invention, as illustrated in the accompanying drawings.

In the drawings.

DESCRIPTION OF THE PREFERRED EMBODIMENTS

Figure 1:
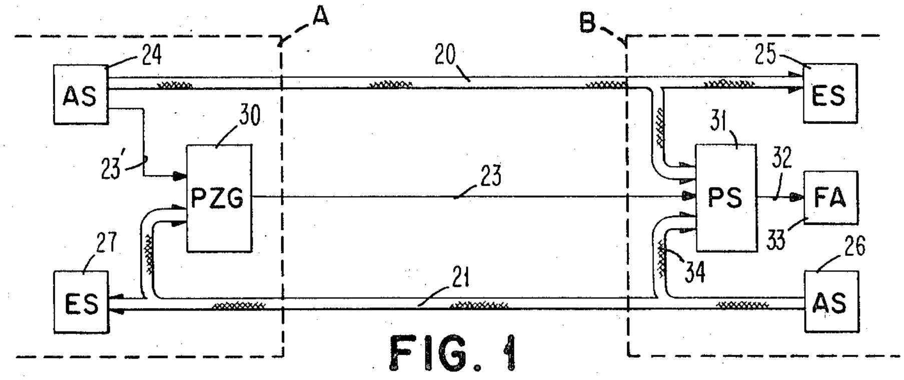
FIG. 1 is a simplified block diagram of a circuit concept in accordance with the invention in a data processing system with two processing units.

The arrangement of FIG. 1 comprises two processing units A and B, forming part of a data processing system. Each processing unit is capable of executing independently of the other operations given in a program, such as arithmetic and logic operations. For the purpose of information exchange, both units are connected to each other by means of two buses 20 and 21. These buses serve to transfer control signals controlling the interaction of units A and B. Control signals can be transferred, for example, from unit B to unit A in order to cause data to be transmitted from unit A to unit B. Buses 20 and 21 can also be used for the transmission of data which may be intermediate results computed by unit A or B and which are to be further processed in the other unit.

Each of the buses 20, 21 consists of a plurality of lines not shown, each of which serves to transmit a binary bit. Precise transmission is checked by both buses being associated with a common parity bit line 23. The binary signal appearing on this line supplements the binary signals on the individual lines of buses 20 and 21 to form an even number of binary signals.

In processing unit A, bus 20 is linked with an output circuit 24 which may be a buffer storage connected to other circuit elements (not shown) of unit A. In processing unit B, bus 20 is connected to an input circuit 25 which may also be a buffer storage linked with circuit elements (not shown) of unit B. Bus 20 thus serves to transmit information from unit A to unit B.

Bus 21 which is used to transfer information in the reverse direction is connected to an output circuit 26 in processing unit B and to an input circuit 27 in unit A. The interaction of circuits 25, 26 with other circuit elements of processing unit B is not described in detail since it is of no significance for the subject matter of the invention. The same applies to the interaction of circuits 26, 27 with other circuit elements of processing unit A.

From output circuit 24, a line 23' leads to a check circuit generator 30, to whose output line 23 is connected. In processing, unit B line 23 is linked with the input of a check circuit 31, a further input of which is conected to a branch 34 of bus 20. An error indication circuit is connected to the output of check circuit 31 via a line 32.

Output circuit 24 supplies a parity bit on line 23', which is associated with the binary signals on the lines in bus 20. Check character generator circuit 30 forms a common parity bit for the two buses 20, 21 from this parity bit and the binary signals simultaneously occurring on the lines in bus 21. The common parity bit is transferred to unit B via line 23. In unit B, the binary information on the lines of buses 20, 21 is evaluated together with the parity bit on line 23 in check circuit 31. If an error is detected by check circuit 31, a signal on line 23 is fed to error indication circuit 33 which indicates to processing unit B that the information received from input circuits 25, 27 is erroneous.

Figure 2:
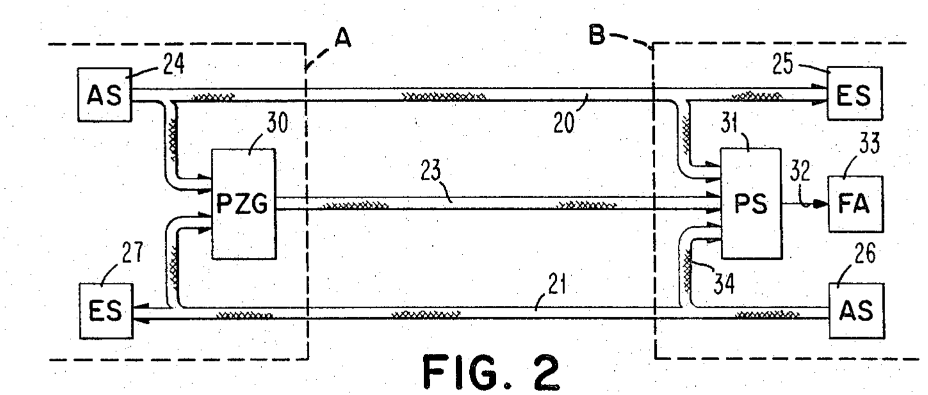
FIG. 2 is a modified embodiment of the circuit of FIG. 1.

FIG. 2 shows a circuit arrangement which is similar to that of FIG. 1. The various elements of the circuit arrangement of FIG. 2 bear the same reference numbers as the corresponding elements of the circuit arrangement of FIG. 1. Check circuit generator 30 in processing unit A is connected both to the lines of bus 20 and the lines of bus 21. In contrast to the circuit of FIG. 1, in which control signals between units A and B are simultaneously transmitted in both directions, the circuit of FIG. 2 is designed in such a manner that transmission of information in one direction and the other takes place at different points in time. During the transmission of information from processing unit A to processing unit B, check character generator 30 generates a check character on bus 23, which is associated with the signals on bus 20. When information is transmitted in the reverse direction, that means from processing unit B to processing unit A, check character generator 30 again generates a check character for the signals on the lines of bus 21. This check character is transferred back to unit B via bus 23. The error check and evaluation are carried out, in the manner described in connection with FIG. 1, in processing unit B which for this purpose is provided with a check circuit 31 and an error indication circuit 33. Buses 20 and 21, on which information is transmitted at different points in time, are OR'd to the logic circuits in check character generator 30. The same applies to the connection of buses 20 and 21 to the logic circuits in check circuit 31.

The structure of the check character used in the circuit arrangements as shown may vary. The check character may be a bit combination representing a check digit which was derived from the information to be transmitted according to a predetermined check algorithm. The check digit may be, for example, the sum of all digits of a number to be transmitted multiplied by the respective positional values. Alternatively, the check character may consist of only one binary bit appearing as the parity bit of a number of binary signals transmitted via bus 20 or 21. The value of the parity bit may be selected in such a manner that it supplements the number of 1-bits on ten lines of bus 20 or 21 to form an even value. In such a case, the buses 23 of FIG. 2 are replaced by a single line, with circuits 30 and 31 being designed to generate or check the even parity. On the other hand, when using a check character consisting of several bits, the check character transfer path must comprise a line (bus 23) for each of these bits; similarly, circuit 30 and 31 for generating or checking the check character must be designed to a given algorithm.

Figure 3:
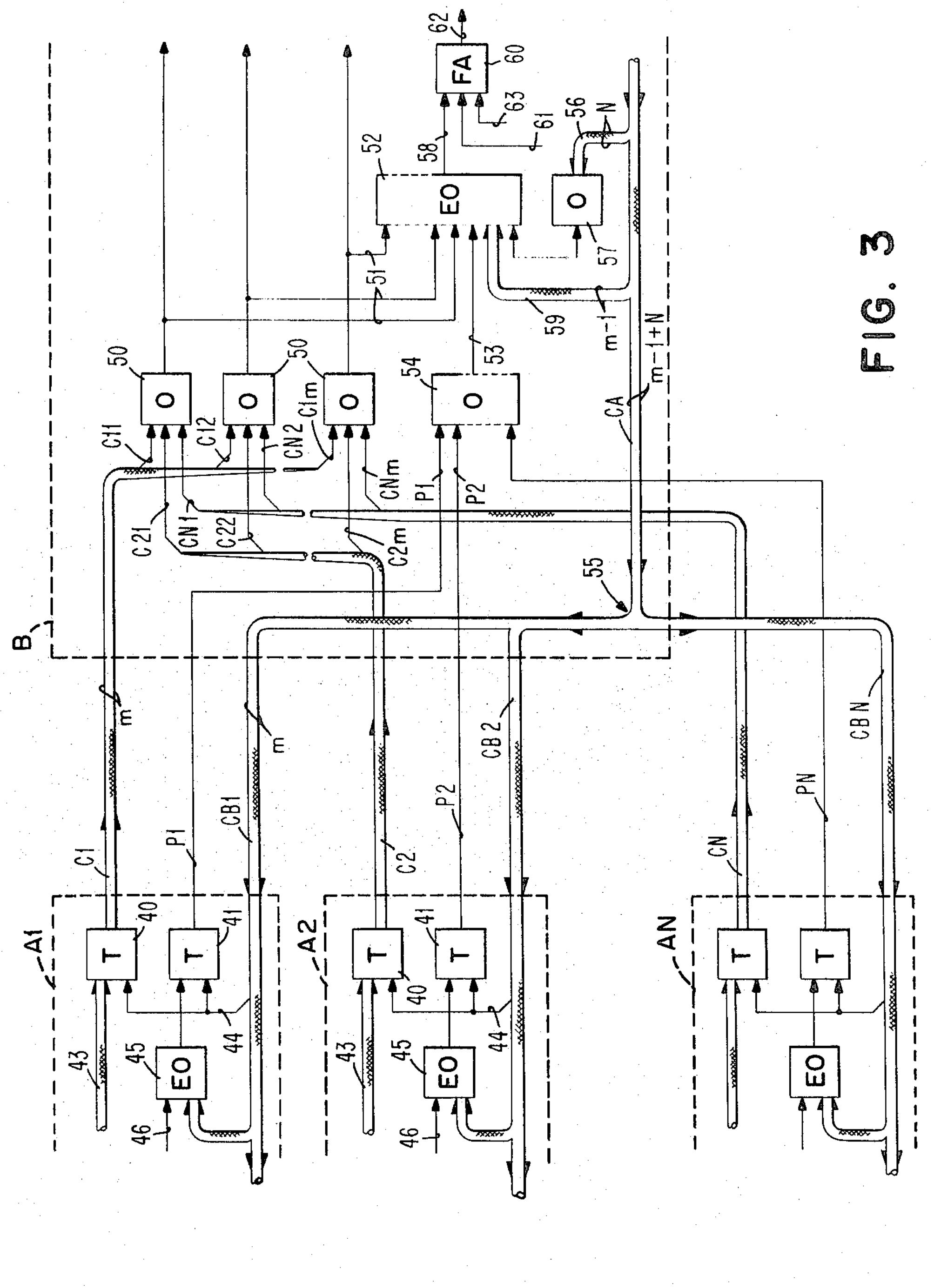
FIG. 3 is a detailed block diagram of an embodiment in accordance with the invention, relating to a data processing system comprising a plurality of processing units.

FIG. 3 shows a more detailed block diagram of a circuit arrangement in accordance with the invention, which is a part of a data processing system consisting of several processing units A, A2, . . . AN and of processing unit B. Each of the processing units A1, A2, . . . AN is connected to processing unit B via a pair of buses C1, CB1, C2, CB2, . . . CN, CBN. These buses serve to transfer control signals. Each of the buses consists of a number of m lines, each of which is used for the transmission of a binary signal. The lines used to transfer data between the individual processing units are not shown in FIG. 3. Each of the units A1, A2, . . . AN is additionally linked, via a check character line P1, P2, . . . PN, with processing unit B which is jointly associated with two of the buses C1, CB1, C2, CB2, CN, CBN. Check character line P1, for example, is associated both with bus C1 and bus CB1 and check character line P2 with bus C2 and bus CB2.

Control line C1 is used to transfer control signals 1 to *n* from unit A1 to unit B; its function complying with that of bus 20 in FIGS. 1 and 2. Accordingly, buses C2 to CN serve to transfer the same number of control signals from units A2 to AN to unit B. Bus CB1 is associated with the reverse direction of transmission, carrying control signals 1 to *m* which are transferred from unit B to unit A1. Buses CB2 to CBN serve to transfer an identical number of control signals from unit B to units A2 to AN.

Unit A comprises a selector circuit in the form of gate circuits 40, 41. Gate circuit 40 is a multiple gate circuit. To its input, a bus 43 is connected, whose lines lead to the circuit elements of unit A1 from where control signals are to be transmitted to unit B. The output of gate circuit 40 is linked with bus C1. A control input 44 of gate circuit 40 is connected to one of the lines in the bus CB1. Gate circuit 41 serves to transfer the parity bit to line P1. Its input is connected to the output of a parity generator circuit 45, and its control input is also linked with line 44. The inputs of parity generator circuit 45 are formed by the lines of bus CB1 on the one hand and by a check line 46 on the other. The latter line carries a parity bit which is associated with the control signals on bus 43 and which is generated in unit A1 by a circuit not shown. From the parity signal of line 46 and the control signals of bus CB1, a common parity bit is generated in parity generator circuit 45. This bit is transferred to line P1 via AND circuit 41. The design of parity generator circuit 45 will be seen from FIG. 5. The circuit consists of a number of EXCLUSIVE-OR circuits 47 which are connected to each other in cascade or tree fashion.

Units A2 to AN are each provided with a gate circuit 40 and 41 and a parity generator circuit 45. The design and arrangement of these circuits are the same as those of the circuits described in conjunction with processing unit A1. Gate circuits 40 in units A2, . . . AN are connected to buses C2, . . . CN and gate circuits 41 to lines P2, . . . PN.

In processing unit B, the control lines of the same order are combined in the different buses C1, C2, . . . CN by means of OR circuits 50. In the topmost OR circuit 50 of FIG. 3, all lines of buses C1, C2, . . . CN carrying the control signal 1 are connected to the input side. Similarly, the OR circuit shown below OR circuit 50 combines the lines carrying the control signal 2, whereas the bottom-most circuit combines all lines carrying the control signal *n*. In unit B, the output lines of OR circuits 50 are connected to circuit elements not shown and in which the control signals transferred from units A1, A2, . . . AN are evaluated. In addition, the outputs of OR circuits 50 are linked with the inputs of a parity check circuit 52 via lines 51. The output of an OR circuit 54, whose inputs are connected to lines P1, P2, . . . PN, is linked with a further input of this parity check circuit via line 53. Further inputs of the parity check circuit are connected to the individual lines of bus CA, to which at 55 buses CB1, CB2, . . . CBN are linked, so that lines of the same order of control lines 1 to *m* in buses C1, C2, . . . CN are in each case in contact with a corresponding line in bus CA. In addition to *m*–1 control lines, but CA comprises a selection control line for each of the units A. These N selection control lines serve to select one of the units A1, A2, . . . AN for the transmission of control signals between the selected unit and processing unit B. These N selection control lines are connected to lines 44, causing gate circuits 40 and 41 to be opened. In addition, the N control lines are connected, via line branch 56, to the inputs of an OR circuit 57 whose output leads to a further input of parity check circuit 52.

Figure 5:
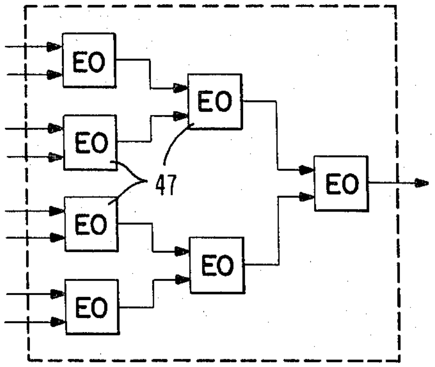
FIG. 5 is an embodiment for generating check information and for performing error checks, as can be used for the arrangements of FIGS. 3 and 4.

The design of parity check circuit 52 corresponds to that of parity generator circuit 45, that means it has a cascade or treelike structure comprising several EXCLUSIVE-OR circuits, as shown in FIG. 5. Output 58 is linked with an error indication circuit 60 containing a bistable latch circuit known per se. The error indication circuit receives timing signals via line 61 at times at which it is capable of storing an error signal from check circuit 52. Via line 62, error indication circuit 60 supplies an error signal to evaluation circuits not shown. After the error signal on line 62 has been evaluated, error indication circuit 60 is reset to its original state by means of a signal on line 63.

Subsequently, the operation of the circuit arrangement of FIG. 3 is described in detail. It is assumed that unit B requests that control signals be transmitted between unit A2 and unit B. For this purpose, unit B generates a selection signal, appearing on line 44 of unit A2, on the selection line which in bus CA is associated with unit A2. This signal opens gate circuits 40 and 41 in unit A2, so that control signals can be transferred from bus 43 to transfer line C1. Simultaneously, control signals are supplied, via bus CB2, from unit B to unit A2. From these control signals and the parity bit provided by unit A2 on line 46, the parity generator circuit generates a parity bit for the control signals acting at that time upon the lines of buses C2 and CB2. Via the opened gate circuit 41, the output signal of parity generator circuit 45 reaches line P2, being transmitted to parity check circuit 52 via line P2 and OR circuit 54. In addition, all signals of the control lines in bus CA are transferred to the parity check circuit via bus branch 59. Via bus branch 56 and OR circuit 57, the selection control signal transmitted to line 44 in unit A2 is fed to parity check circuit 52. Finally, all control signals of the n control lines in bus C2 are fed to parity check circuit 52 via lines 51 and OR circuits 50. The signals appearing on its input are checked by check circuit 52 for the correct parity. If it is found that the actual parity does not comply with the predetermined one, circuit 52 supplies a setting signal to error indication circuit 60 which at the end of transmission at the time at which a timing signal occurs on line 61 causes error indication circuit 60 to be set. The error signal generated on line 62 when error indication circuit 60 is set indicates to unit B that an error has occurred during the transmission of the control signals. This error message can be evaluated, for example, by repeating the transfer operation. If at the time of the timing signal an output signal from the parity check circuit is not present on line 61, error indication circuit 60 is not set. The absence of a signal on line 62 indicates to unit B that the signal transmitted was correct.

Figure 4:
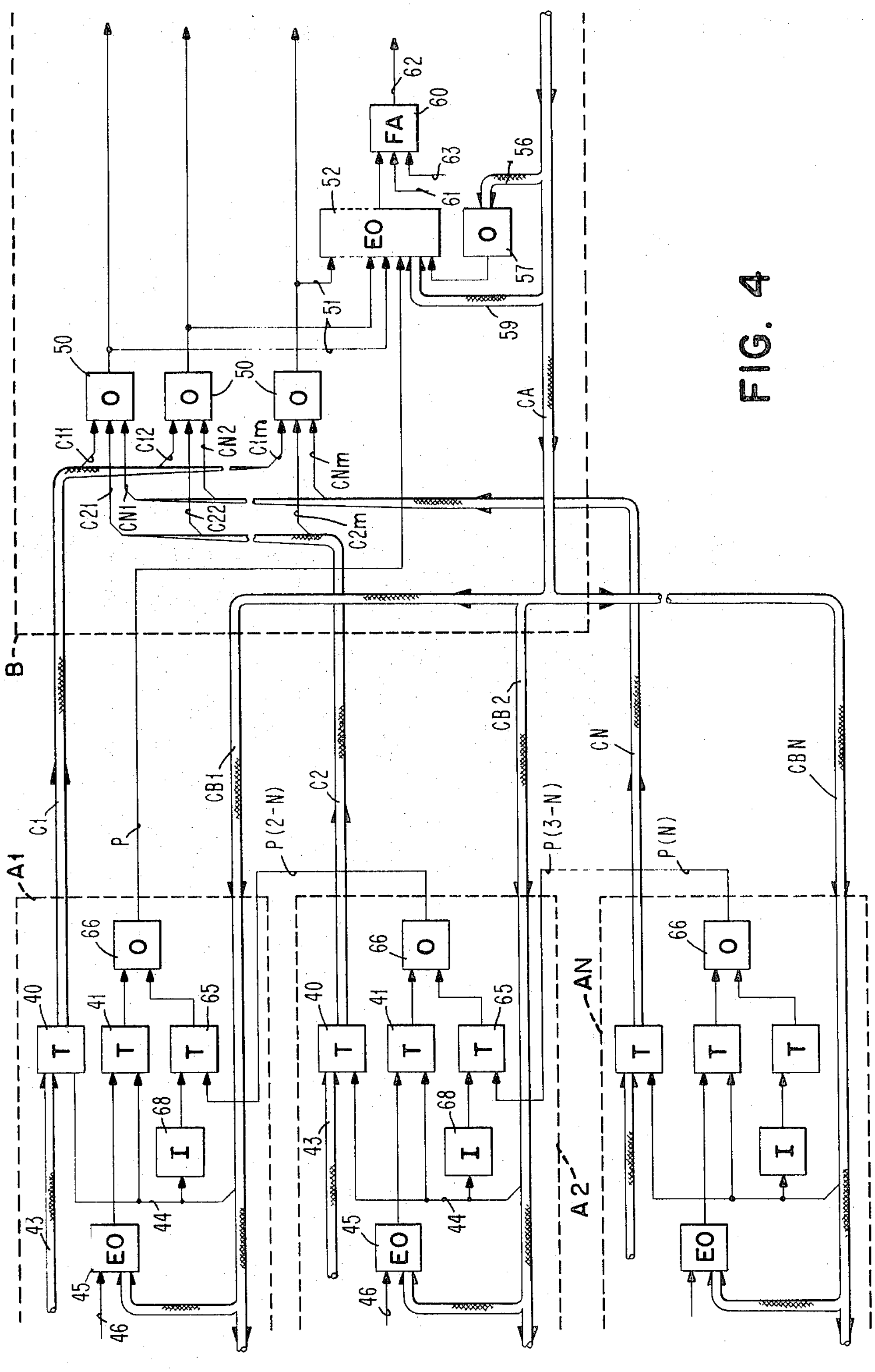
FIG. 4 is a modified embodiment of the circuit of FIG. 3.

With the exception of the arrangement of the lines for transmitting the parity bit between units A1, A2, . . . AN and unit B, the circuit arrangement of FIG. 4 is essentially similar to that of FIG. 3. In place of lines P1, P2, . . . PN used in the circuit arrangement of FIG. 3 for this purpose, the circuit arrangement of FIG. 4 uses only one line P. For circuit elements with identical functions, the reference numbers of FIG. 3 were retained in FIG. 4. The use of only one line instead of lines P1, P2, . . . PN results in OR circuit 54 being eliminated in processing unit B. Line P is directly linked with the input of parity check circuit 52, to which line 53 is connected in FIG. 3. Processing unit A1 comprises an additional gate circuit 65 whose output is linked with line P via an OR circuit 66. Via a line P(2-N), an input of gate circuit 65 leads to an OR circuit 66 in unit A2, which corresponds to OR circuit 66 of unit A1. A control input of gate circuit 65 is connected to selection control line 44 via an inverter 68. Unit A2 comprises similar circuit elements 65, 66, and 68. In this embodiment, the input of gate circuit 65 is linked with OR circuit 66 of the succeeding unit A via a line P(3-N). With respect to the transmission of the parity signal, units A1, A2, . . . AN form a chain which terminates in line P(N) connected to the output of OR CIRCUIT 66 in unit AN. Lines P(2-N), P(3-N) to P(N) can thus be considered an extension of line P through the individual units A.

For the description of the operation of the circuit arrangement of FIG. 4, it is assumed that control signals are to be transmitted between processing unit A2 and processing unit B and that to this end a request signal on one of the N selection control lines has been transferred, via bus CB2, to line 44 in unit A2. This signal then reaches inverter circuit 68, causing the permanent output signal of the latter to be interrupted. This results in gate circuit 65 being inhibited and the parity line chain to further units being interrupted in the direction of unit AN. The control signal on line 44 also reaches gate circuit 40, opening the latter for a transfer of control signals, via bus C2 and OR circuits 50, to circuit elements (not shown) in unit B. The control signal of line 44 in unit A2 is furthermore transmitted to gate circuit 41, opening the latter for a transmission of the output signal from parity generator circuit 45 to OR circuit 66. Parity generator circuit 45 generates in the manner described in connection with FIG. 3 a common parity bit for the control signals on buses C2 and CB2, for which purpose it receives a parity bit for the control signals on bus C2, via line 46, and all control signals simultaneously transmitted from unit B to unit A2 via bus CB2. The output signal of OR circuit 66 in unit A2 is applied, via line P(2-N), to gate circuit 65 in unit A1 which is opened by means of inverter 68. The parity signal generated in unit A2 is thus transmitted to line P via gate circuit 65 and OR circuit 66 in unit A1, reaching the input of parity check circuit 52 in unit B via line P. This parity check circuit operates in the same manner as has been described in connection with FIG. 3. An output signal generated by the parity check circuit is fed to error indication circuit 60, by means of which it is indicated to the control of unit B.

Control signal transmission between processing unit B and the remaining A units is carried out in the same manner as has been described in connection with the transmission between unit B and unit A2.

The description of the operation of the circuit arrangement of FIGS. 3 and 4 proceeds from the fact that, for time reasons, information is to be simultaneously transmitted in both directions of transmission. Under certain conditions, it may be expedient to transmit information in only one direction, whereas information in the reverse direction is transmitted at a later point in time. However, modifications of this kind do not exceed the scope of the present invention.

While the invention has been particularly shown and described with reference to preferred embodiments thereof, it will be understood by those skilled in the art that various changes in form and details may be made therein without departing from the spirit and scope of the invention.

What is claimed is:

1. In a data processing system of the type in which at least first and second processing units include first and second output means adapted to receive information bit groups produced in the first and second units respectively and include first and second input means, and in which first and second buses respectively connect the first output means to the second input means and the second output means to the first input means for the transfer of information bit groups between the units, an error detection circuit comprising a common parity bit generator in the first unit coupled to the first output means and to the second bus generating a parity bit for information bit groups transferred from the first unit to the second unit and from the second unit to the first unit, a common parity bit transfer path, said common path being connected to the generator to transfer the parity bits generated by the generator from the first to the second unit, and a check circuit in the second unit connected to the two buses and to the common transfer path for checking the correctness of the transmitted information bit groups for both directions of transmission.

2. The system set forth in claim 1 further comprising at least one additional first processing unit, each additional unit having a respective parity bit generator and each having an input means coupled to the second bus and an output means coupled to the second input means by a respective first bus for two way information transfer, an additional parity bit path for each additional first unit interconnecting a respective parity bit generator and said check circuit in the second unit, and means in each first unit connected to the second bus and controlled by information bits thereon from the second unit for selectively rendering the first units active for transmission with the second unit.

3. The system set forth in claim 2 further comprising means coupling all buses to the check circuit of the second unit.

4. The system set forth in claim 1 further comprising at least one additional first processing unit, each having a respective parity bit generator and each having an input means coupled to the second bus and an output means coupled to the second input means by a respective first bus for two way information transfer, logic means in each first unit connected to the second bus and responsive to information bits thereon for connecting the respective generator to said check circuit in the second unit by way of the common parity bit transfer path, and means in each first unit including said logic means connected to the second bus and controlled by information bits thereon from the second unit for selectively rendering the first units active for transmission with the second unit.

The system set forth in claim 4 further comprising means coupling all buses to the check circuit of the second unit.

6. The system set forth in claim 4 wherein the logic means includes interconnection paths between each first unit for extending the common parity bit path to each first unit, and a pair of gating circuits in each first unit interposed within said interconnection paths and controlled by the second unit for coupling the parity bit generator of only a selected unit to the common path.

7. The system set forth in claim 1 wherein information is transferred simultaneously in both directions between said units, said combination further comprising means coupling the generator to the first output to receive a parity bit associated with information leaving the first unit for the second unit and to the second bus to receive information being received simultaneously in the first unit from the second unit, said generator producing parity bits in response to said coupled check data and simultaneously received information.

8. In a data processing system of the type in which at least first and second processing units include first and second output means adapted to receive information bit groups produced in the first and second units respectively and include first and second input means, and in which first and second buses respectively connect the first output means to the second input means and the second output means to the first input means for the transfer of information bit groups between the units, an error detection circuit comprising a check character generator in the first unit coupled to the first output means and to the second bus generating a check character for information bit groups transferred simultaneously from the first unit to the second unit and from the second unit to the first unit, a common check character transfer path, said common path being connected to the generator to transfer the check characters generated by the check character generator from the first to the second unit, and a check circuit in the second unit connected to the two buses and to the common check character transfer path for checking the correctness of the transmitted information bit groups for both directions of transmission.

9. The system set forth in claim 8 further comprising at least one additional first processing unit, each having an input means connected to the second bus, each having a respective check character generator and a respective common check character transfer path and each having an output means coupled to the second input means by a respective first bus, logic means in each first unit connected to the second bus and responsive to information bits thereon for connecting the respective check character generator to said check circuit in the second unit by way of the common check character transfer path, and means in each first unit including said logic means connected to the second bus and controlled by information bits thereon from the second unit for selectively rendering the first units active for transmission with the second unit.

* * * * *

PO-1050 (5/69)

UNITED STATES PATENT OFFICE
CERTIFICATE OF CORRECTION

Patent No. 3,763,470 Dated October 2, 1973

Inventor(s) Hellmuth R. Geng et al

It is certified that error appears in the above-identified patent and that said Letters Patent are hereby corrected as shown below:

In the claims, column 8, line 13, the claim should be numbered as claim 5, --5. --. Column 8, after line 36, at the end of claim 7 insert the following claim 10, which corresponds to original claim 8 of the application:

--10. The system set forth in claim 1 wherein said generator and check circuit are each comprised of exclusive-or circuits connected in cascade form.--

Signed and sealed this 9th day of July 1974.

(SEAL)
Attest:

McCOY M. GIBSON, JR.
Attesting Officer

C. MARSHALL DANN
Commissioner of Patents